United States Patent
Musumeci

(10) Patent No.: US 10,108,985 B2
(45) Date of Patent: Oct. 23, 2018

(54) MITIGATION OF FAILURES IN AN ONLINE ADVERTISING NETWORK

(71) Applicant: Yahoo Holdings, Inc., Sunnyvale, CA (US)

(72) Inventor: Gian-Paolo Musumeci, Berkeley, CA (US)

(73) Assignee: OATH INC., New York, NY (US)

( * ) Notice: Subject to any disclaimer, the term of this patent is extended or adjusted under 35 U.S.C. 154(b) by 738 days.

(21) Appl. No.: 14/508,942

(22) Filed: Oct. 7, 2014

(65) Prior Publication Data

US 2016/0098764 A1 Apr. 7, 2016

(51) Int. Cl.
*G06Q 30/00* (2012.01)
*G06Q 30/02* (2012.01)

(52) U.S. Cl.
CPC ..... *G06Q 30/0275* (2013.01); *G06Q 30/0264* (2013.01)

(58) Field of Classification Search
None
See application file for complete search history.

(56) References Cited

U.S. PATENT DOCUMENTS

| | | | | |
|---|---|---|---|---|
| 7,657,501 B1* | 2/2010 | Brown | | G06F 9/5083 707/999.002 |
| 9,032,162 B1* | 5/2015 | Chang | | G06F 13/161 711/149 |
| 2005/0165925 A1* | 7/2005 | Dan | | G06F 9/5083 709/224 |
| 2013/0091241 A1* | 4/2013 | Goetz | | H04L 67/322 709/217 |
| 2014/0258374 A1* | 9/2014 | Suryanarayanan | ... | H04L 67/101 709/203 |
| 2014/0258521 A1* | 9/2014 | English | | G06F 9/5083 709/224 |
| 2016/0098764 A1* | 4/2016 | Musumeci | | G06Q 30/0275 705/14.61 |

OTHER PUBLICATIONS

International Search Report and Written Opinion issued in corresponding application PCT/US2015/048509, dated Dec. 8, 2015, pp. 1-9.

* cited by examiner

*Primary Examiner* — Matthew T Sittner
(74) *Attorney, Agent, or Firm* — Cooper Legal Group, LLC

(57) ABSTRACT

Access requests to a database are monitored for average time taken to fulfill the requests and whether a queue of unfulfilled requests is building up beyond an acceptable threshold. When the queue has built up beyond the acceptable threshold and/or when the average time taken to fulfill the requests has exceeded a delay threshold value, database access requests may be rejected. In one advantageous aspect, a graceful degradation in performance may be achieved by selectively rejecting access requests of a lower priority and favoring access requests of a higher priority for execution.

20 Claims, 7 Drawing Sheets

US 10,108,985 B2

MITIGATION OF FAILURES IN AN ONLINE ADVERTISING NETWORK

TECHNICAL FIELD

This disclosure relates to systems and techniques for managing and communicating requests in a real-time bidding (RTB) system.

BACKGROUND

Many companies use online advertising networks to advertise to users. Online advertising networks communicate advertisement opportunities to third parties. Advertisement opportunities occur when devices view content on a content publisher's website. Advertising networks seek to efficiently match advertisement opportunities with advertisers who wish to advertise to a particular user.

Advertisement bidding exchanges facilitate the matching of advertisers with advertisement opportunities. Some advertisement bidding networks cannot efficiently reach all advertisers who may wish to advertise on a particular publisher's website or to a particular user. Attempting to reach more advertisers or advertisement agencies slows down the network and introduces a higher failure rate in the communication of bid requests.

SUMMARY

The present disclosure provides techniques for preventing a request-response system from performance degradation by selectively rejecting incoming data access requests when system overload is detected.

In one example embodiment, a computer-implemented method of controlling access to an information database is disclosed. The method includes receiving multiple data access requests wherein each request has a request type associated therewith, tracking a response performance of a number of previously received requests having a same request type, receiving a current request for data, checking for a number of previously received requests having the same request type that have yet to be fulfilled at a time when the current request is received, computing, based on the tracking, a probable execution time delay for fulfilling the current request, and deciding whether to reject the current request without fulfilling as a first function of the number of previously received requests having the same request type that have yet to be fulfilled and the probable execution time delay.

In another example aspect, a database access apparatus is disclosed. The apparatus includes a request reception module that receives a current data access request, the current data access request having an associated universal request locator (URL), a performance tracker module that maintains statistics of how many requests for the URL are still pending and an average time taken to fulfill a number of requests received within a previous time window, an overload protection module that decides whether to fulfill the current data access request or to reject the current data access request based on statistics from the performance tracker module, a request fulfillment module that, when the overload protection module decides to fulfill the current data request, facilitates access to data located at the associated URL, and a request rejection module that, when the overload protection module decides to reject the current data request, sends a rejection message along with a reason for the rejection.

In yet another example aspect, a computer system comprising a storage device, a server and a client is disclosed. The storage device stores data. The server controls access to the data stored in the storage device. The client sends multiple requests to the server to access data stored in the storage, wherein the server receives the multiple data access requests wherein each request has a request type associated therewith, tracks a response performance of a number of previously received requests having a same request type, receives a current request for data from the client, checks for a number of previously received requests having the same request type that have yet to be fulfilled at a time when the current request is received, computes, based on the tracking, a probable execution time delay for fulfilling the current request, and decides whether to reject the current request without fulfilling as a first function of the number of previously received requests having the same request type that have yet to be fulfilled and the probable execution time delay.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Like reference symbols in the various drawings indicate like elements.

DETAILED DESCRIPTION

In the following detailed description, numerous specific details are set forth to provide a full understanding of the present disclosure. The specific examples or embodiments of the present disclosure may be practiced without some of these specific details. In other instances, certain well-known structures and techniques have not been shown or described in detail but are nonetheless part of the present disclosure.

In many real life uses of computers and data storage, equipment and modules often look for information or data that is not available to them right away but is available at another location that can be communicatively reached. For example, in a medical application, the computer terminal in a patient's room may want to access diagnostic or medication information from a database that is located at a medical facility's central facility. Many computers and point of sales terminals may access database of a retailer for information related to inventory being sold and purchase transactions.

An online advertisement insertion platform, such as Brightroll's BRX platform, may include computers and servers that access database reachable across a cloud-based connection for exchanging information related to bids and placement of video advertisements to geographically spread out users, e.g., users spread over multiple continents.

Figure 3:
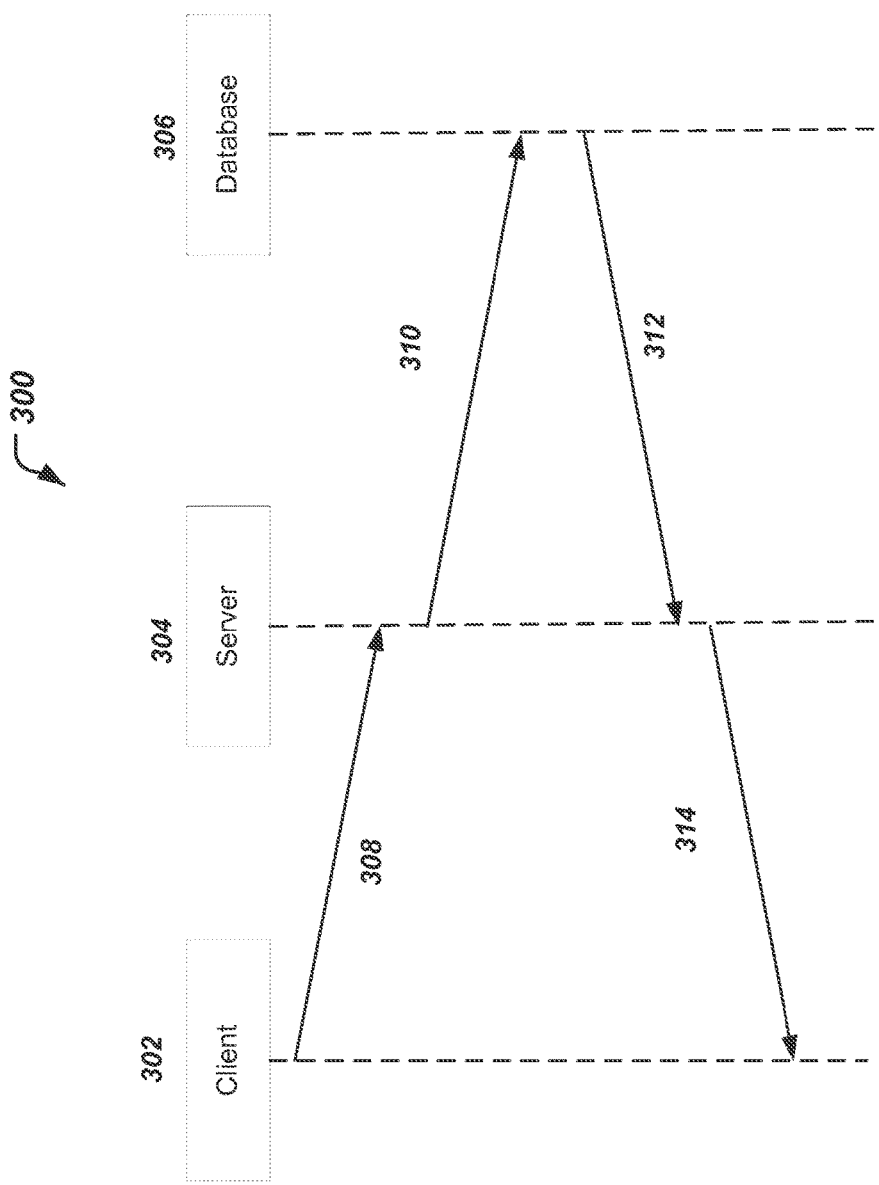
FIG. 3 illustrates an example of messages exchanged among requesting and responding entities.

FIG. 3 depicts an example signal flow diagram 300 in which a requesting client 302 requests data from a server 304 that controls access to a database 306 on which the requested data is stored. The example messages may be as follows. Using message 308, the client 302 may request one or more data items. For example, an HTTP get request may request certain data. The client 302 may send the request 308 to the server 304 and let server figure out identity of the database (or storage location) 306 where the data is. Alternatively, client 302 may send the request 308 to the database 306 directly, and the request may be monitored by the server 304.

To fulfil the request 308, the server 304 may send a select message 310 to the database 306 and receive data in message 312 from the database 306. Depending on the type of request 308, multiple messages 310 may be issued to multiple smaller portions of the total received data via multiple messages 312.

Often, the client 302 may issue multiple requests 308 in succession, without necessarily waiting for a response 314 back from the server 304 or the database 306. In some implementation, the server 304 may put all the received requests 308 in a queue and may execute the corresponding database accesses serially, or with some level of parallel implementation. In many situations, e.g., to complete a financial transaction or to present a multimedia program to a user, the data requested by the client 302 may have an implicit usefulness window to the module of the client 302 which requests the data. Therefore, it may be desirable for the client 302 to receive the requested data within a time budget. This time budget may be made known to the server 304 or not.

During operation, the access to database 306 may, from time to time, slow down. This may be caused due to several reasons, including but not limited to, traffic increase or equipment failure in the communication network over which the messages 310 and 312 travel, and so on. Other reasons may include hardware failure or disk access delays in database 308. Regardless of the reason for delay, there may be situations in which multiple requests from a client 308 may accumulate in a queue or a buffer at the server 304.

Unless carefully designed, a system which implements a preceding discussed request/response strategy may exhibit behavior in which catastrophic failures may occur due to many reasons. For example, delays in the request/response time may build up, causing more and more requests to be buffered, waiting to be fulfilled. The buffer build up may make it difficult may make it difficult to prioritizing later arriving higher priority requests over the requests that are already buffered. Another undesirable failure may occur due to escalation in requests from requester who may issue additional data access requests when previously sent requests are not fulfilled within an expected time. This escalation may thus end up causing an overload of number of incoming and pending requests at the server 304. The techniques disclosed in the present document can be used to mitigate these operational limitations, and others. In one advantageous aspect, a potential system overload problem may be detected before the problem becomes a reality. The problem may be mitigated by selectively denying certain incoming requests from being fulfilled in order to maintain a desired performance of the system.

Various features and embodiments are discussed with reference to an online video advertisement insertion system in which millions of requests/response transactions may be ongoing on a per-minute basis among clients and servers that are geographically distributed and may be communicating with each other over the public internet or a managed cloud based computational system.

Figure 1:
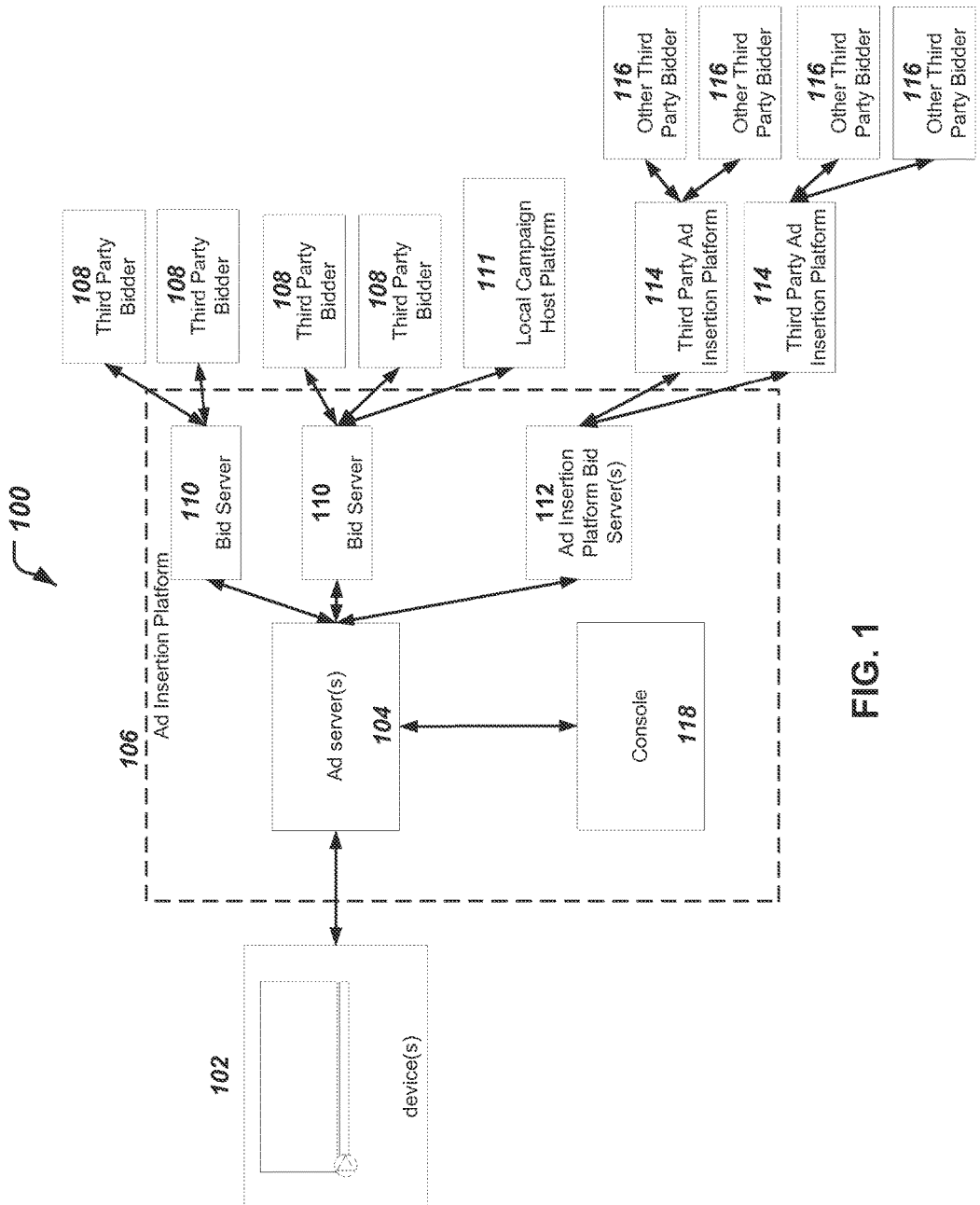
FIG. 1 illustrates an embodiment of an online video advertisement insertion architecture in a real-time bidding (RTB) system.

FIG. 1 illustrates an example of an online video advertisement insertion architecture 100. A device 102 is communicatively coupled to an ad server 104 of a video ad insertion platform 106. The ad server 104 provides a front end entry point to the video ad insertion platform 106. The device 102 may be of any type of device such as a mobile phone, tablet, or computer. The device 102 can be communicatively coupled via a wired connection, a wireless connection, or via any type communications network such as the internet.

The device 102 interfaces with a publisher (not shown) to view content such as a video on the device 102. A communication is sent to the video ad insertion platform 106 whenever there is an opportunity to play an advertisement to a user of the device 102. Information relating to the publisher, device 102, and advertisement opportunity is passed to the ad server 104. The ad server 104 processes this information and provides the advertisement opportunity to one or more third-party bidders 108 via one or more bid servers 110. The bid servers 110 provide a bidding interface between third party bidders 108 and the video ad insertion platform 106. Any number of third-party bidders 108 can be communicatively coupled to any number of bid servers 110. Each third-party bidder 108 has a chance to place a bid on the advertisement opportunity. The winning bidder receives the opportunity to deliver a video advertisement to the device 102.

In an embodiment, the third-party bidders 108 are advertisers who wish to place advertisements on client devices 102. The third-party bidders 108 process the advertisement opportunity, use their internal logic to determine whether they want to bid on the advertisement opportunity and how much they want to pay, and present a bid response bad to the bid server 110. In an embodiment, the third-party bidders 108 are advertising agencies that have relationships with one or more advertisers. Similarly, the advertisement agencies use their own logic to determine whether they want to bid on the advertisement and place a bid accordingly.

In an embodiment, third party bidders 108 are given a predetermined time period to respond with a bid response. Bid responses from the third party bidders 108 who do not respond within the predetermined time period are ignored. Placing a predetermined time limit on bid responses prevents the appearance of publisher latency. This prevents a user on a device 102 from navigating away from a particular publisher's webpage before the advertisement or publisher content has been displayed.

After a winning bid has been determined, the ad insertion platform 106 informs the device 102 that an advertisement will be placed. The winning bidder is notified that they have placed the winning bid and is provided with information that allows them to transmit a video advertisement to the device 102. In an embodiment, the ad insertion platform 106 places the advertisement on the device 102. In an embodiment, information involved with the transaction is logged in a database, a series of files, or other format known in the art. The information logged can include bid amount, advertisement, publisher information, advertiser information, date, time, domain, subject matter of advertisement, subject matter of publisher content, and other information.

In an embodiment, a third party ad insertion platform bid server 112 is communicatively coupled to one or more other third party ad insertion platforms 114. The other third party ad insertion platforms 114 may be other advertisement insertion platforms offered by other vendors such as TubeMogul, Yahoo, etc. The third party ad insertion platforms 114 are communicatively coupled to one or more other third party bidders 116. In an embodiment, the third party ad insertion platforms 114 are communicatively coupled to one or more bid servers 110 that service the one or more third party bidders 108.

Advertisement opportunities are communicated to one or third party ad insertion platform bid servers 112 as well as the one or more bid servers 110. It is sometimes the case that a particular ad insertion platform 106 has relationships with particular third party bidders 108 and not other third party bidders 116 that have relationships with other third party ad insertion platforms 114. Providing advertisement opportunities to one or more third party ad insertion platforms 114 allows the ad insertion platform 106 to maximize the reach of an advertisement opportunity to the other third party bidders 116. This increases the chance that a particular publisher and advertiser will be efficiently matched.

In an embodiment, a console 118 allows third parties or an administrator to view information relating to the ad insertion platform 106. The console 118 allows users to access one or more databases (not shown) and to view diagnostic information relating to the ad insertion platform 106. In an embodiment, the diagnostic information includes graphs and statistics relating to latency and timeout performance of the system and the communication of bid requests. In an embodiment, the console 118 is accessible via the internet.

In an embodiment, the ad insertion platform 106 provides ad data to the device 102 using a VAST (Digital Video Ad Serving Template) format. VAST is a specification by the Interactive Advertising Bureau (IAB) that provides a common ad response format for video players that enables video ads to be served across all compliant video players. A VAST document provided by a RTB system includes a media file that points to a client side component used to collect video ad activities on the client side.

In another embodiment, the content publisher utilizes the VPAID (Video Player Ad-Serving Interface Definition). VPAID establishes a common interface between video players and ad units to allow interactive in-stream ad experiences. VPAID also provides a communication protocol between video players and ad units to allow a single executable ad. The executable ad incorporates software logic that is executed as part of ad playback. The ad can be displayed in-stream with the content publisher's video content.

In an embodiment, the ad insertion platform 106 is communicatively coupled to one or more third-party tracking and measurement services (e.g., Nielsen, comScore, Telemetry, etc.). The third party services provide various additional information such as demographic information about users, popularity of video and audio content, effectiveness of an advertisement campaign, and other tracking and measurement services to the ad insertion platform 106.

In an embodiment, a local campaign host platform 111 is coupled to a bid server 110. The local campaign host platform 111 determines whether it wants to serve the one or more stored advertisements (not shown) to the device 102 based on internal logic. Advertisers or advertisement agencies place rules on the placement of stored advertisements on the local campaign host platform 111. In an embodiment, the rules associated with the stored advertisements on the local campaign host platform 111 are associated with a campaign set by an advertiser, advertisement agency, or other entity that has a business relationship with the advertiser. The rules can include information relating to the desired publisher, desired content of the publisher for the advertisement, the device, the user using the device, the user's demographic profile, desired bid amount or range, and other rules associated with the ad placement. In an embodiment, the bids associated with the stored advertisements of the local campaign host platform 116 are compared with the bid response of third party bidders 108. In another embodiment, the local campaign host platform 111 delivers a store advertisement to the device 102 without the ad insertion platform 106 presenting the bid request to the third party bidders 108 in the case that the bid for the stored advertisements is above a certain predetermined threshold. In an embodiment, the stored advertisements can be stored locally, on the cloud, on a dedicated server, or any other storage platform.

FIG. 1 is not intended to be limiting to the particular number of servers or division of server functions (e.g., ad server 104, bid server 110, third party ad insertion platform bid servers 112). Any one of the bid servers 110 can perform the functions of the third party ad insertion platform bid servers 112. Any number of third party bidders 108 and third party ad insertion platforms may be communicatively coupled to any number of bid servers 110 or ad insertion platform bid servers 112.

Any one of the ad servers 104, bid servers 110, third party ad insertion platform bid servers 112, or console 118 may be on a single ad insertion platform offered by a single vendor (e.g., the BRX platform offered by Brightroll, Inc.). Any one of the ad servers 104, bid servers 110, or third party ad insertion platform bid servers 112 may be implemented in individual software packages, application programming interfaces, dedicated servers, or on the cloud.

Figure 2:
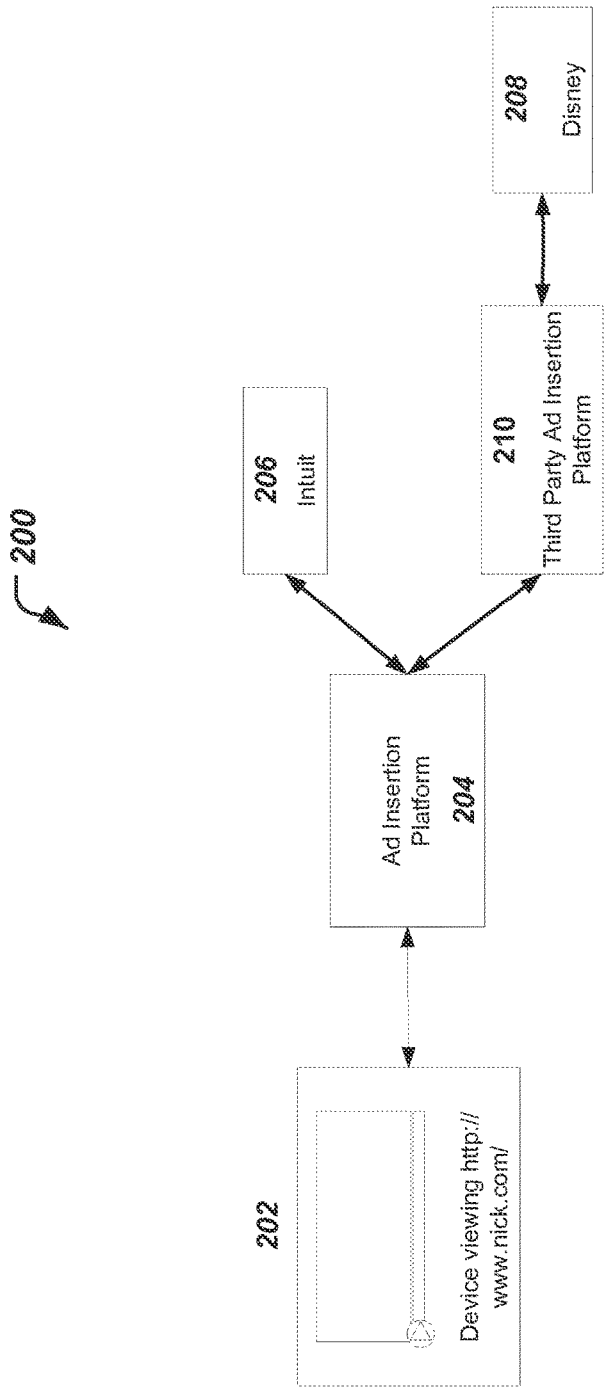
FIG. 2 illustrates an embodiment of a simplified online video advertisement architecture where a device is viewing cartoons.

FIG. 2 illustrates a simplified example of an online video advertisement insertion architecture 200 where a device 202 is viewing cartoons for children on www.nick.com. In this example, the ad insertion platform 204 has a relationship with Intuit 206 which makes software for business and tax purposes but not Walt Disney 208 which makes cartoons and other entertainment for children. Intuit is likely to have little interest in an advertisement opportunity on http://www.nick.com and is unlikely to provide a high value bid response. In contrast, Walt Disney will likely highly value this advertisement opportunity and may want to pay a higher figure to place its advertisements on a website where children are viewing cartoons.

In this simplified example, the advertisement opportunity from the device 202 viewing nick.com is communicated from the ad insertion platform 204 to both Intuit 206 and a third party ad insertion platform 210. The third party ad insertion platform 210 uses its internal logic to process the bid request and communicates this advertisement opportunity to Disney 208. Both Disney 208 (through the third party ad insertion platform 210) and Intuit 206 respond to the advertisement opportunity with a bid response. In this example, the bid from Disney 208 is higher than the bid from Intuit 206 and Disney 208 is identified as the winning bidder. In an embodiment, any associated fees expected from the third party ad insertion platform 210 are taken into consideration when identifying the winning bid.

Expanding exposure to an advertisement opportunity allows an ad insertion platform 204 to maximize on an advertisement opportunity. Both the ad insertion platform 204 and publisher are able to collect more money for a Disney advertisement on nick.com than an Intuit advertisement. This also allows publishers to place more appropriate advertisement content on their websites. For example, if nick.com had an exclusive relationship with the ad insertion platform 204 it would be unable to place Disney advertisements if advertisement opportunities were not communicated to third party ad insertion platforms 210.

FIG. 2 is presented as a simplified example to aid in the understanding of the disclosure. The disclosed technology encompasses any number of relationships with any number of advertisers, advertisement agencies, or third party ad insertion platforms.

Referring back to FIG. 1, in an embodiment, the one or more third party ad insertion platforms 114 perform their own logic on bid requests and communicate the bid requests to other third party bidders 116. The extra logic and communication that is performed on the bid request by the one or more third party ad insertion platforms 114 introduces delay. Some third party ad insertion platforms 114 take longer to respond to bid requests from ad insertion platform bid server(s) 112 than third party bidders 108 do because of the additional processing required. Some of these bid responses will be outside of a predetermined timeout threshold and will be ignored by the ad insertion platform 106.

Figure 4:
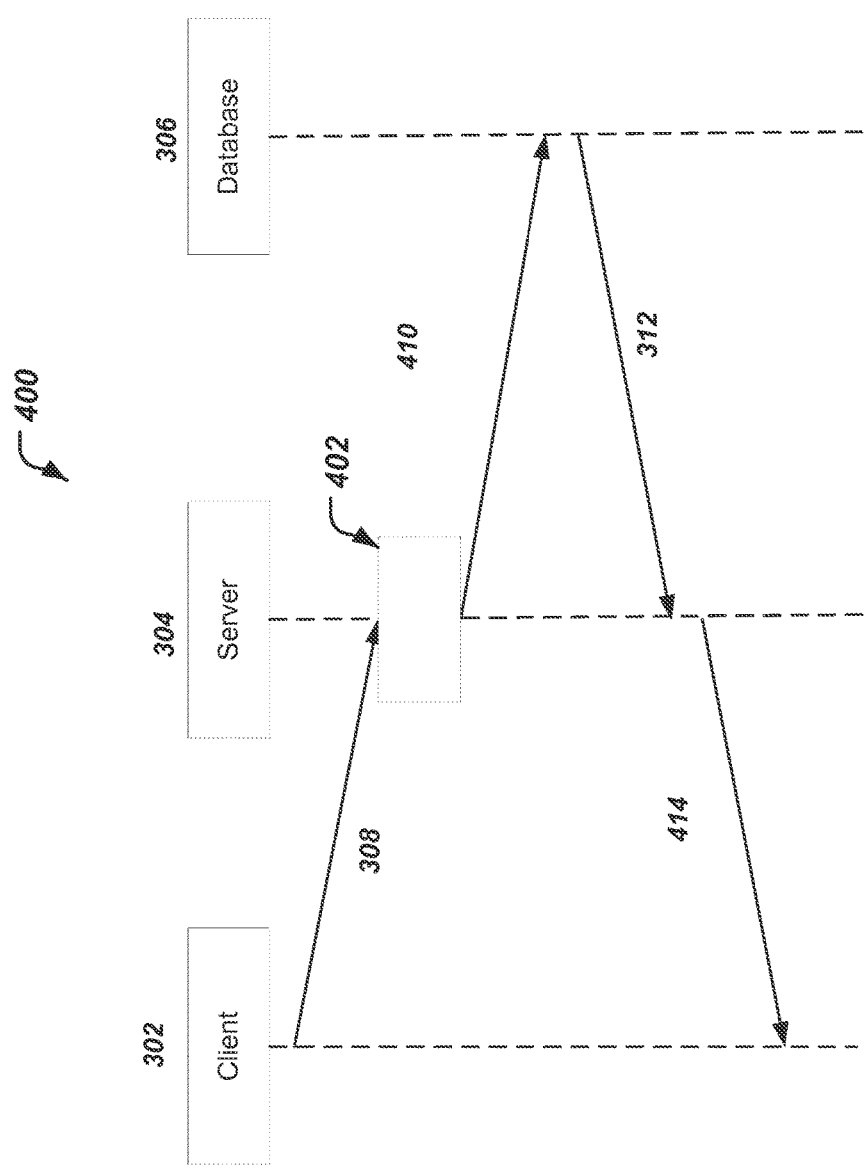
FIG. 4 illustrates an example of messages exchanged among requesting and responding entities.

FIG. 4 depicts an example system 400 in which one or more clients 302 can access data stored in a database or a storage device 306. A mechanism 402 at the server 304 monitors the performance of the system 400 in fulfilling requests 308. In one aspect, the mechanism 402 may act as a "fuse" or a "circuit breaker" in an electrical system by detecting system overload and tripping and temporarily halting passage of requests through the system 400.

Figure 5:
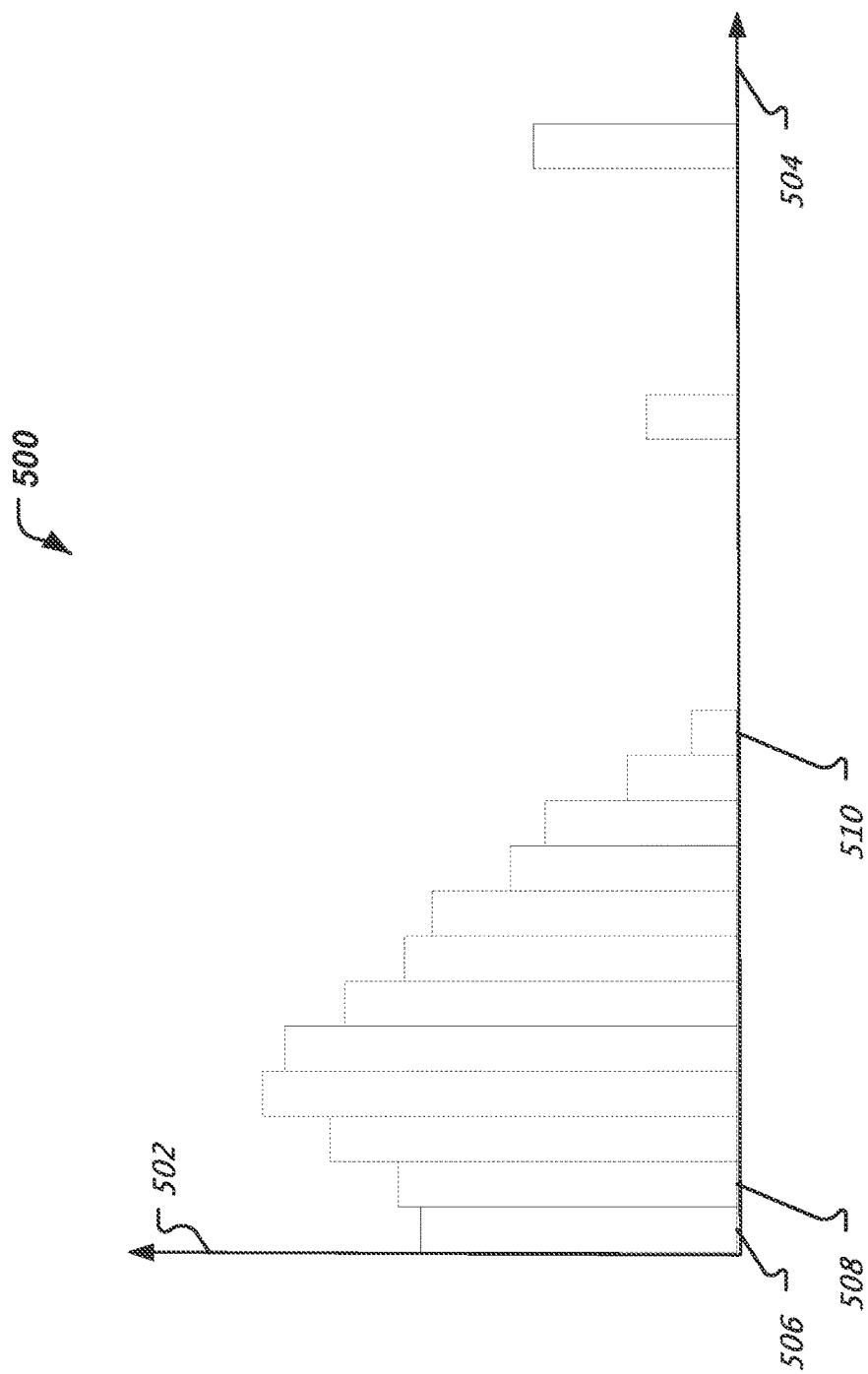
FIG. 5 illustrates an example of statistics gathered for data access requests.

FIG. 5 depicts a graph 500 that highlights an example of statistics that can be maintained and tracked by the system 400 to facilitate the operation of the mechanism 402. In graph 500, the vertical axis 502 shows the number of previously fulfilled requests that were fulfilled within a given time interval, plotted along the horizontal axis 504. As an example, period 506 may represent the response time interval of 0 to 1 millisecond, 508 may represent 1 to 2 millisecond, 510 may represent 11 to 12 millisecond, and so on.

By tracking the performance of requests, e.g., as depicted in graph 500, the system 400 may be able to predict, in a probabilistic way, the response time for fulfilling a current received request. If the predicted fulfillment time is considered to be unacceptable, or as not meeting a performance threshold, the system 400 may then reject the request.

The request monitoring by the server 304 may provide additional operational benefits. In one illustrative example, a client 302 may expect or find it useful to receive a response 414 to its database query 308 within 5 seconds. This time period may be implicitly or explicitly (e.g., by including in the message 308) known to the server 304. If, at a given time, the queue of unfulfilled requests for database 306 is backed up to more than 5 seconds, without the server's intervention, the client 302 would have to wait 5 seconds before which to find out that no response was received to the request 308. On the other hand, a server 304, that is tracking performance of the system 400, may determine that the queue length (duration) has exceeded the desired response time, and may immediately reject an incoming database access request 308 in such a case. As a result, the client 302 may find out that the system 400 is busy right away, instead of having to wait the entire time of the desired response time, e.g., 5 seconds in this example, to find out that its request 308 has failed. In one example, if the client 302 finds out that a request A has failed immediately after the client 302 sends the request to the server 304, it may save un-necessary work by the client 302 and the system 400 of issuing and fulfilling several additional database requests 308 in the next 5 seconds, and then finding out that request A has failed.

In another beneficial aspect, the server 304 may also improve the operational throughput of the database 306 by filtering out requests 308, which the server 304 can predict are going to fail, from even reaching an incoming request queue at the database 306. The operation of the database 306 thus does not suffer from detrimental effects of an excessively backed up request queue, which collectively benefits all different clients 302 that have requested access to the database 306. For example, without the benefit from the mechanism 402, a request 308 may get forwarded to the database even when the queue of unfulfilled request at the database 306 exceeds a client's desired response time. Since many databases, e.g., SQL database, do not provide for a mechanism to cancel a database query once the query enters the database's work queue, this request will be un-necessarily worked upon by the database 306, and the result will be returned as message 312, too late to be useful to client 302. The use of mechanism 402 advantageously can avoid database's such unnecessary work.

Figure 6:
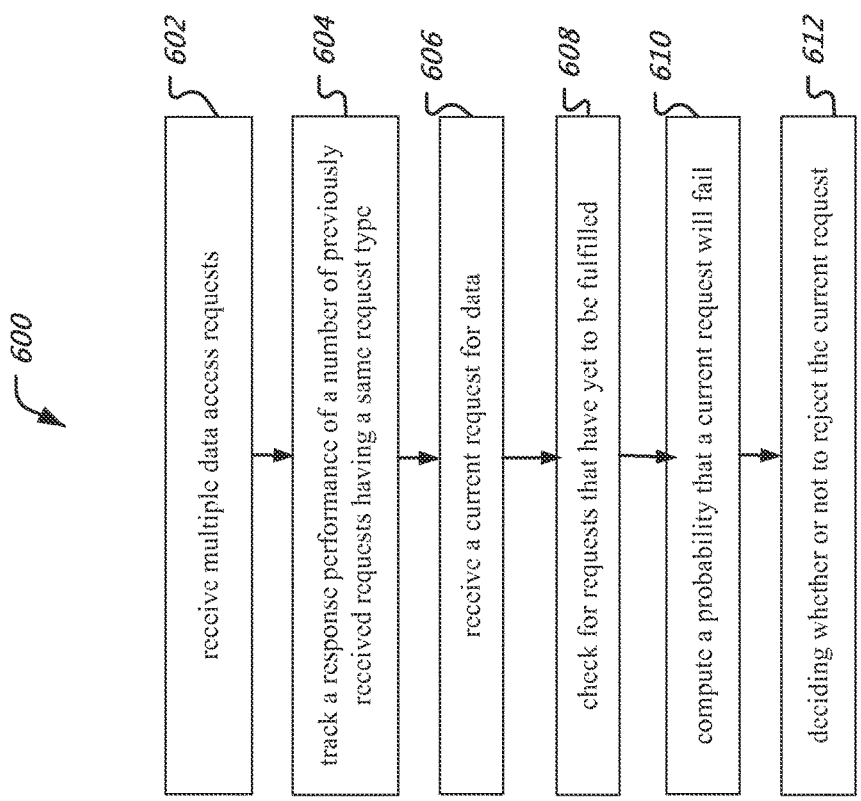
FIG. 6 is a flowchart depicting an example of a method for controlling access to data.

FIG. 6 is a flowchart depiction of an example method 600 for controlling access to an information database.

The method 600 includes, at 602, receiving multiple data access requests wherein each request has a request type associated therewith.

The method 600 includes, at 604, tracking a response performance of a number of previously received requests having a same request type. In some embodiments, the tracking response time performance includes generating a histogram of the number of previously received requests as a second function of a time interval and how many of previously fulfilled requests were fulfilled within that time interval. In some implementation, the method 600 further includes estimating the probable execution time using the histogram.

The method 600 includes, at 606, receiving a current request for data.

The method 600 includes, at 608, checking for a number of previously received requests having the same request type that have yet to be fulfilled at a time when the current request is received.

The method 600 includes, at 610, computing, based on the tracking, a probable execution time delay for fulfilling the current request. In some embodiments, the probable execution time delay corresponds to an average delay for fulfilling the number of previously received requests having the same request type, as tracked by the response performance tracking.

The method 600 includes, at 612, deciding whether to reject the current request without fulfilling as a first function of the number of previously received requests having the same request type that have yet to be fulfilled and the probable execution time delay. In some embodiments the deciding operation may include refraining from fulfilling the current request when the number of previously received requests having the same request type that have yet to be fulfilled is greater than a first threshold value. In some embodiments, the first function is a linearly weighted combination of the number of previously received requests having the same request type that have yet to be fulfilled and the probably execution time delay.

In some embodiments, when it is decided to reject the request without fulfilling, the method 600 may include sending a response message indicating a reason for rejection. For example, the reason for rejection may indicate that the system is busy. Alternatively or additionally, a time interval may be included for a future retry time. Alternatively or additionally, the expected completion time may also be included, which may facilitate debug operation. For example, an access request may implicitly have to be satisfied in 100 msec. Upon reception, the system may determine that it would take 150 msec to satisfy the request. The system may then reject the request and indicate in the rejection that the system estimated that the request would have taken 150 msec. This information may be advantageously used by the requester in scheduling future requests.

In some embodiments, the method 600 further may include fulfilling the current request when the probable execution time delay does not exceed a delay threshold value. The delay threshold value may be explicitly included in the request or may be implicitly derived based on the type of the data access request. In some embodiments, the delay threshold value may be updated based on the tracking. For example, in some embodiments, when tracking indicates that the average response time over the last x seconds of observation window has slowed down, the delay threshold value may be raised higher.

In some embodiments, the method 600 includes deriving the request type for the current request based on content of the current request.

Figure 7:
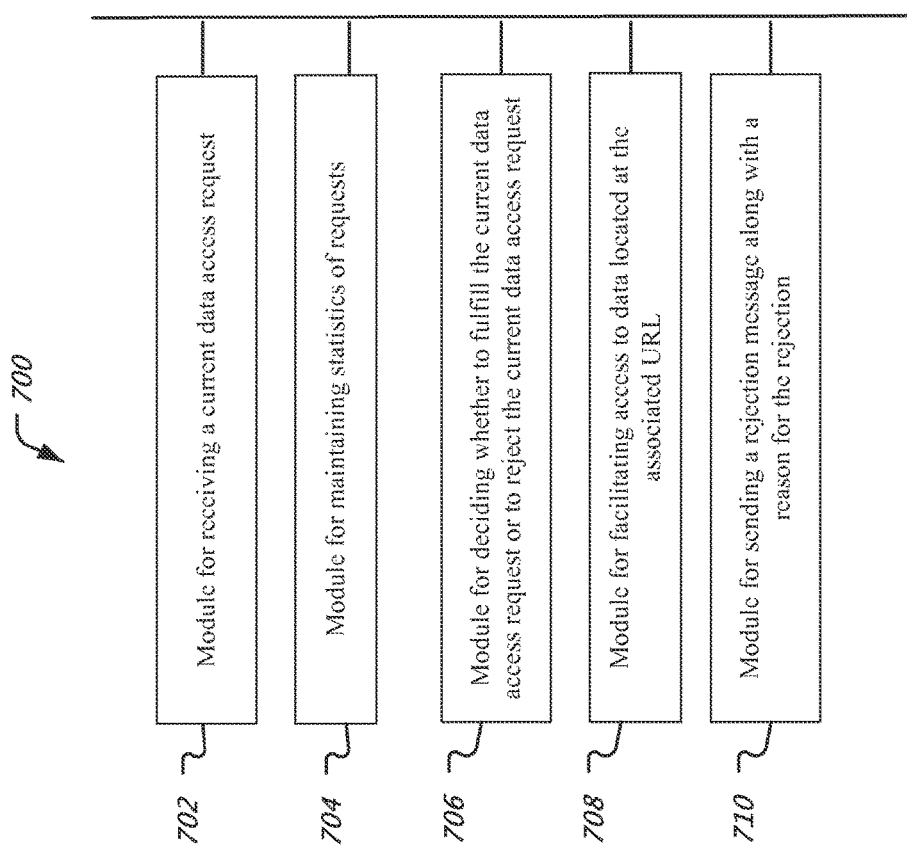
FIG. 7 is a block diagram depiction of an example of a data access apparatus.

FIG. 7 is a block diagram depicting an example of an apparatus 700 that controls access to a data storage. In some embodiments, the apparatus 700 may include a data storage device having a database stored thereupon and a processor that controls access to the data storage.

The apparatus 700 includes module 702, e.g., a request reception module, that receives a current data access request, the current data access request having an associated universal request locator (URL).

The apparatus 700 includes module 704, e.g., a performance tracker module, that maintains statistics of how many requests for the URL are still pending and an average time taken to fulfill a number of requests received within a previous time window. In some embodiments, the performance tracker module may include a statistics module that calculates the average time taken to fulfill the number of requests within the previous time windows as a weighted average in which more recent fulfillment times are weighted greater than less recent fulfillment times.

The apparatus 700 includes module 706, e.g., an overload protection module, that decides whether to fulfill the current data access request or to reject the current data access request based on statistics from the performance tracker module. In some embodiments, the overload protection module may decide based on a priority associated with the current data access request. In some embodiments, the overload protection module may decide to fulfill the current request when the average time taken to fulfill the number of requests does not exceed a delay threshold value. In some embodiments, the weighting may be a linear function of how far in the past a previous request was fulfilled. For example, the fulfillment time of a request that was fulfilled 10 seconds ago may only count with half as weight than a request that was fulfilled 5 seconds ago.

The apparatus 700 includes module 708, e.g., a request fulfillment module that, when the overload protection module decides to fulfill the current data request, facilitates access to data located at the associated URL, and The apparatus 700 includes module 710, e.g., a request rejection module that, when the overload protection module decides to reject the current data request, sends a rejection message along with a reason for the rejection.

As illustrated in this document, an ad insertion platform can manage bid requests and mitigate failures due to latency. Certain aspects of the disclosed technologies can be implemented as a device that includes a processor and a memory comprising processor executable code. The processor executable code, when executed by the processor, configures the device, including the components therein, to perform any one of and/or all operations that are described in the present application. The aspects described can be included in a dedicated server or as software packages and may be communicatively coupled via wire or wirelessly.

For the purposes of illustration, the present disclosure sometimes refers to existing industry standards or specifications as examples of how the disclosed techniques may be used in a real-time bidding system. The disclosed technologies, however, can be used in various real-time bidding systems beyond the specific real-time bidding systems and/or standards mentioned in the examples of the present application.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

For example, one aspect of the disclosed embodiments relates to a computer program product that is embodied on a non-transitory computer readable medium. The computer program product includes program code for carrying out any one or and/or all of the operations of the disclosed embodiments.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A computer-implemented method of controlling access to an information database, comprising:
   receiving, with a processor, multiple data access requests, wherein each request has a request type associated therewith;
   tracking, with the processor, a response performance of received requests having a same request type, where the tracking comprises:
      generating a histogram of the received requests by determining a plurality of time intervals associated with fulfillment of requests of the same request type, and determining a number of requests of the same request type that were fulfilled for each time interval of the plurality of time intervals;
   receiving, with the processor, a current request for data;
   checking, with the processor, for a number of previously received requests having the same request type that have yet to be fulfilled at a time when the current request is received;
   computing, with the processor, based on the tracking and the histogram, a probable execution time delay for fulfilling the current request;
   extracting, from the current request, a time period within which fulfillment of the current request is useful;
   predicting whether the current request is going to fail based upon the probable execution time delay, the time period within which fulfillment of the current request is useful and the number of previously received requests having the same request type; and
   deciding, with the processor, whether to reject the current request without fulfilling based upon the predicting.

2. The method of claim 1, further comprising:
   fulfilling the current request when the probable execution time delay does not exceed a delay threshold value.

3. The method of claim 1, further comprising:
   deriving the request type for the current request based on content of the current request.

4. The method of claim 1, wherein the deciding operation includes refraining from fulfilling the current request when the number of previously received requests having the same request type that have yet to be fulfilled is greater than a first threshold value.

5. The method of claim 2, wherein the delay threshold value is the time period within which fulfillment of the current request is useful.

6. The method of claim 2, further comprising: updating the delay threshold value based on the tracking the response performance.

7. The method of claim 1, wherein the method further includes, upon deciding to reject the current request without fulfilling: sending a response message indicating a reason for the rejection.

8. The method of claim 1, wherein the predicting is based upon a first function comprising a weighted linear combination of the number of previously received requests having the same request type that have yet to be fulfilled and the probable execution time delay.

9. The method of claim 1, wherein the probable execution time delay corresponds to an average delay for fulfilling the number of previously received requests having the same request type, as tracked by the response performance tracking.

10. A computer system, comprising:
    a storage device that stores data;
    a server configured to control access to the data stored in the storage device; and
    a client configured to send multiple requests to the server to access data stored in the storage,
    wherein the server is further configured to:
       receive the multiple data access requests, wherein each request has a request type associated therewith;
       track a response performance of received requests having a same request type, wherein to track the response performance the server is configured to generate a histogram of the received requests by determining a plurality of time intervals associated with fulfillment of requests of the same request type, and determining a number of requests of the same request type that were fulfilled for each time interval of the plurality of time intervals;
       receive a current request for data from the client;
       check for a number of previously received requests having the same request type that have yet to be fulfilled at a time when the current request is received;
       compute, based on the tracking and the histogram, a probable execution time delay for fulfilling the current request;
       extract, from the current request, a time period within which fulfillment of the current request is useful;
       predict whether the current request is going to fail based upon the probable execution time delay, the time period within which fulfillment of the current request is useful and the number of previously received requests having the same request type; and
       decide whether to reject the current request without fulfilling based upon the predicting.

11. The computer system of claim 10, wherein the server is further configured to:
    fulfill the current request when the probable execution time delay does not exceed a delay threshold value.

12. The computer system of claim 10, where the server is further configured to:
    derive the request type for the current request based on content of the current request.

13. The computer system of claim 10, wherein to decide whether to reject the current request without fulfilling, the server is further configured to:
    refrain from fulfilling the current request when the number of previously received requests having the same request type that have yet to be fulfilled is greater than a first threshold value.

14. The computer system of claim 10, wherein the predicting is based upon a first function comprising a weighted linear combination of the number of previously received requests having the same request type that have yet to be fulfilled and the probable execution time delay.

15. The computer system of claim 10, wherein the probable execution time delay corresponds to an average delay for fulfilling the number of previously received requests having the same request type, as tracked by the response performance tracking.

16. A non-transitory computer-readable medium storing computer executable instructions that when executed by a processor cause the processor to perform a method of controlling access to an information database, the method comprising:
    receiving multiple data access requests, wherein each request has a request type associated therewith;
    tracking a response performance of received requests having a same request type, where the tracking comprises:

generating a histogram of the received requests by determining a plurality of time intervals associated with fulfillment of requests of the same request type, and determining a number of requests of the same request type that were fulfilled for each time interval of the plurality of time intervals;

receiving a current request for data;

checking for a number of previously received requests having the same request type that have yet to be fulfilled at a time when the current request is received;

computing based on the tracking and the histogram, a probable execution time delay for fulfilling the current request;

extracting, from the current request, a time period within which fulfillment of the current request is useful;

predicting whether the current request is going to fail based upon the probable execution time delay, the time period within which fulfillment of the current request is useful and the number of previously received requests having the same request type; and deciding whether to reject the current request without fulfilling based upon the predicting.

17. The computer-readable medium of claim 16, the method further comprising:

fulfilling the current request when the probable execution time delay does not exceed a delay threshold value.

18. The computer-readable medium of claim 16, the method further comprising:

deriving the request type for the current request based on content of the current request.

19. The computer-readable medium of claim 16, wherein the deciding operation includes refraining from fulfilling the current request when the number of previously received requests having the same request type that have yet to be fulfilled is greater than a first threshold value.

20. The computer-readable medium of claim 17, wherein the delay threshold value is the time period within which fulfillment of the current request is useful.

* * * * *